Dec. 14, 1937.   A. C. LIND   2,102,570
SCREENING APPARATUS FOR LIQUIDS
Filed Aug. 12, 1936   3 Sheets-Sheet 1

Inventor
Arthur C. Lind,
By Barker & Collings
Attorneys

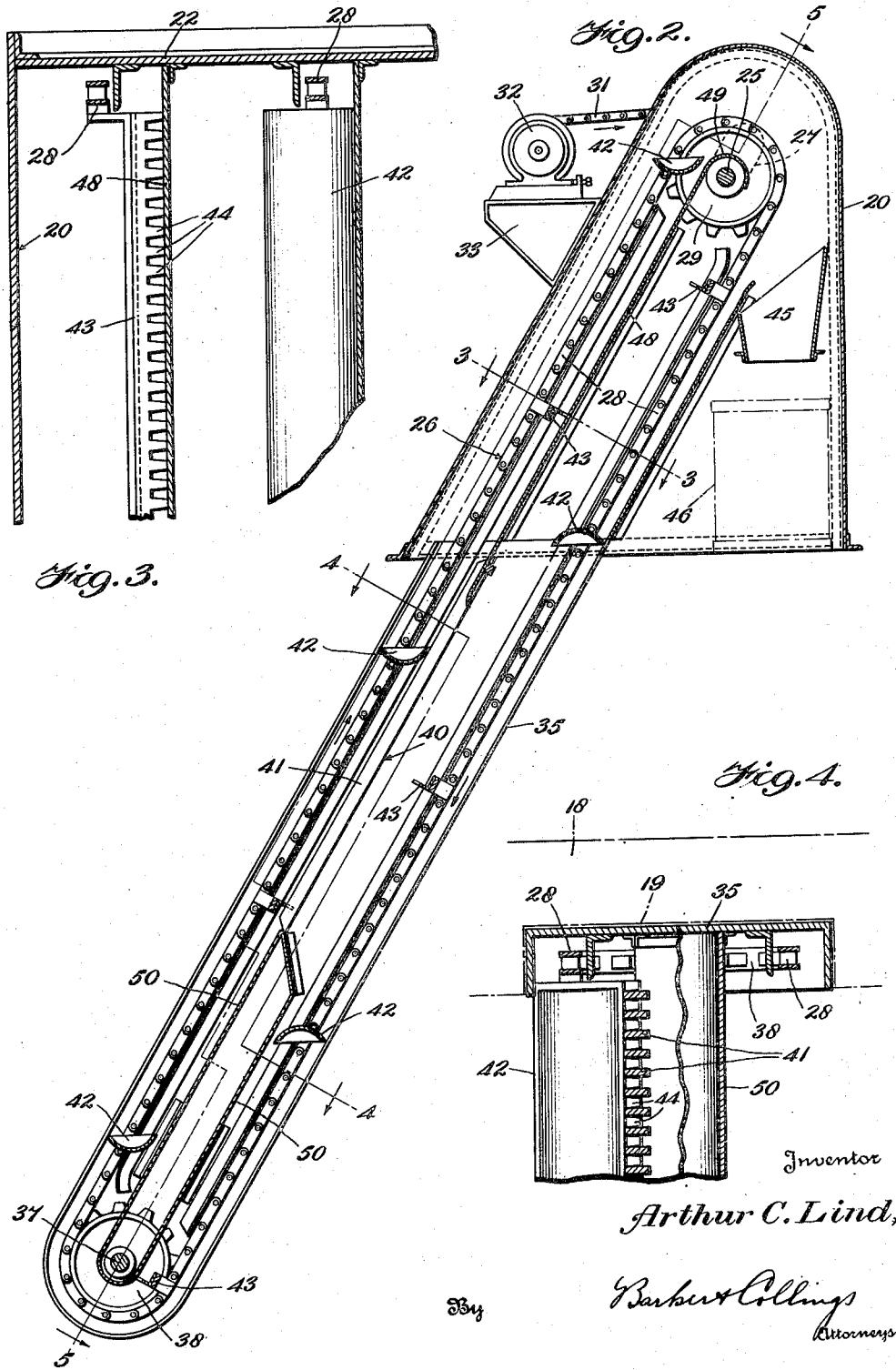

Dec. 14, 1937.  A. C. LIND  2,102,570

SCREENING APPARATUS FOR LIQUIDS

Filed Aug. 12, 1936  3 Sheets-Sheet 3

Inventor
Arthur C. Lind,
By Barker & Collings
Attorneys

Patented Dec. 14, 1937

2,102,570

UNITED STATES PATENT OFFICE 2,102,570

SCREENING APPARATUS FOR LIQUIDS

Arthur C. Lind, Milwaukee, Wis., assignor to Chain Belt Company, Milwaukee, Wis., a corporation of Wisconsin Application August 12, 1936, Serial No. 95,652

6 Claims. (Cl. 210—176)

This invention relates to screening apparatus for liquids, and has for one of its objects to provide improved mechanism of this character which is particularly adapted for use in connection with liquid conduits provided with settling basins or pits for sand, grit and/or other settleable solids carried by liquids, which may also bear floating debris which will not settle.

In liquid separation and purification for industrial plants, as well as in sewage disposal and other similar fields, it is customary to conduct the liquid bearing light floating solids which will not settle, as well as sand, grit and heavier solids which will settle, through conduits provided with settling pits or basins, which being of larger area than the conduits, retard the flow of the liquid and permit the heavy solids to fall to the bottom. It is also customary to provide screens, often of the bar type, in or adjacent the settling basins, to remove from the liquid pieces of wood, twigs, branches, rags, hair, and other unsettleable debris. It is furthermore usual practice to associate with such screens automatic mechanism for removing the accumulated debris from the face of the screen, and in some cases such mechanism has also been employed to elevate the settled solids from the pit or basin.

The present invention has for one of its principal objects the general improvement of the screens and removal apparatus of this type; and for a further object, the provision of a combined screen, removal apparatus, and driving means therefor in a unitary structure which may be bodily introduced into and removed from the conduit and basin.

With the above and other objects in view, which will appear as the description proceeds, the invention consists in the novel details of construction, and combinations and arrangements of parts, more fully hereinafter disclosed, and particularly pointed out in the appended claims.

Referring to the accompanying drawings forming a part of this specification, in which like reference characters designate like parts in all the views:—

Fig. 2 is an enlarged central vertical sectional view through the screen and removal assembly;

Figure 5:
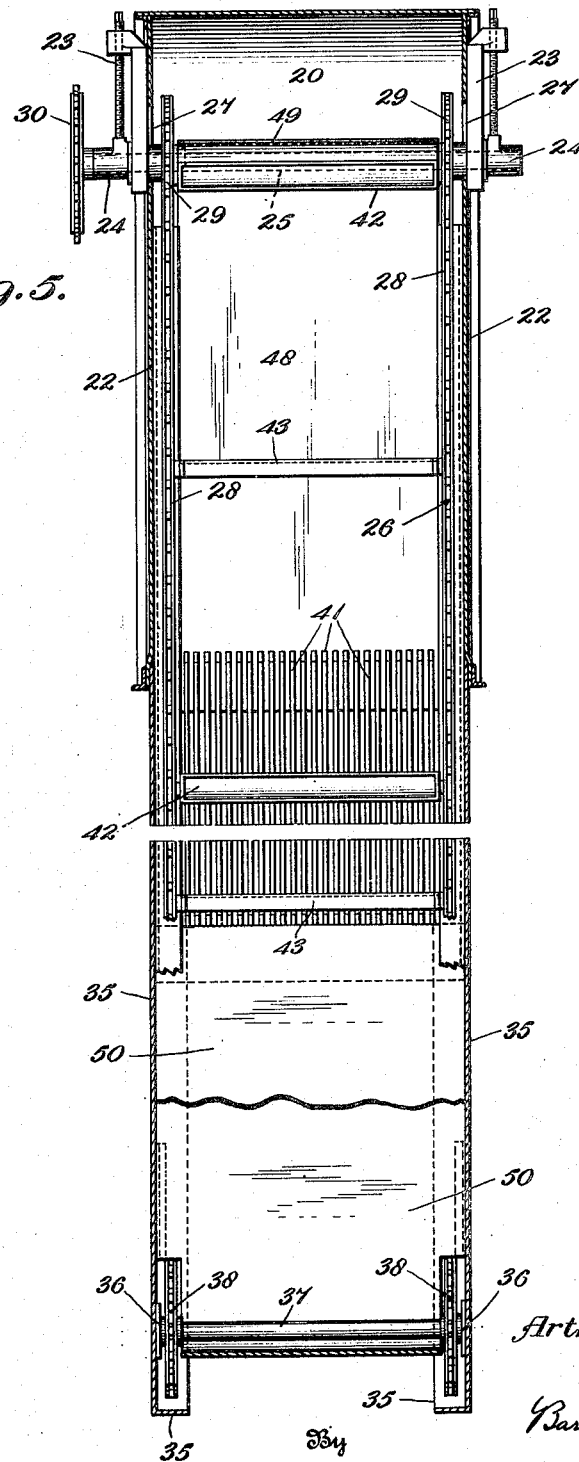

Figs. 3 and 4 are fragmentary cross sectional views, taken approximately on the planes indicated respectively by the lines 3—3 and 4—4 of Fig. 2; and Fig. 5 is a front elevational sectional view, taken approximately on the plane indicated by the line 5—5 of Fig. 2.

Referring more particularly to the said drawings, 10 indicates a conduit which may be of concrete, masonry, or the like, provided at some point in its length with a settling pit or basin 11, extending below the floor 12. The influent end 13 may comprise either a tube 14 or an open, or closed channel which supplies the liquid carrying the floating debris and settleable solids to the basin 11, as well known in the art, discharge from said pipe 14, or channel, as the case may be, being controllable by a sliding gate 15. The effluent portion 16 of the conduit is preferably provided with an adjustable weir 17 for controlling the level of the liquid in the conduit, as is well understood in this class of work.

The unitary screen and detritus removing apparatus constituting the gist of the invention comprises a superstructure or housing 20 adapted to be mounted upon the top wall 21 of the conduit and having side walls or plates 22 to which are secured suitable take-ups 23 having journals 24 for the transversely extending head shaft 25 of an endless conveyor 26. The side plates 22 of the housing are slotted as at 27 to permit of longitudinal movement of the shaft 25 for the purpose of taking up slack which may occur in the laterally spaced chains or belts 28 of the endless conveyor.

Figure 1:
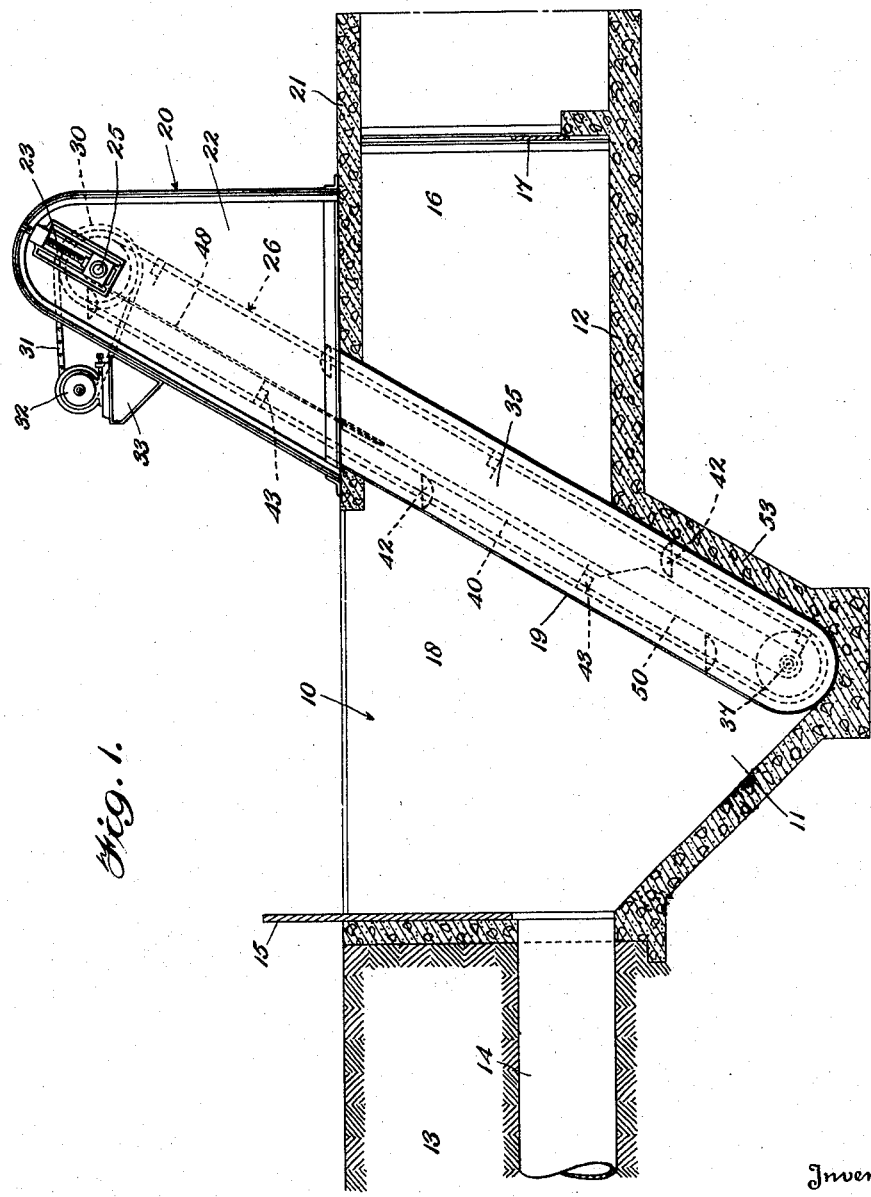
Figure 1 is a longitudinal sectional view through a typical liquid conduit provided with a solids settling pit or basin, and showing in side elevation one form of screen and detritus removing assembly constructed in accordance with the invention.

These chains or belts 28 are trained about sprocket wheels 29 carried by the head shaft 25 and extend downwardly, as will be readily understood from Figs. 1, 2 and 5. The head shaft 25 also carries a sprocket 30 exterior of the housing 20 about which passes a chain 31 which is driven from any suitable motor 32 mounted upon a bracket 33 carried by the housing 20.

The lower end of the housing 20 is open, as clearly shown in Figs. 2 and 5, and the side walls 22 have secured to them by welding, riveting, bolting, or the like, the downwardly extending channel frame members 35 which at their lower ends are provided with suitable bearings 36 for journalling the tail shaft 37 carrying sprockets 38 about which the chains 28 are trained, as will be readily understood. The opposed side walls 18 of the conduit 10 are provided with elongated recesses 19 into which the channel members 35 are slidably received, as indicated in Figs. 1 and 4.

Suitably supported between the channel frame members 35 in position to extend across the conduit 10, is a screen 40 here shown as comprising a plurality of spaced vertically disposed bars 41, and which serves to arrest any floating matter carried by the liquid, such as pieces of wood, twigs, rags, hair and the like. The said screen, as will be clear from Figs. 1 and 2, is located between the two runs of the endless conveyor, which latter is driven in the direction indicated by arrows in Fig. 2.

The chains 28 have secured between them at suitably longitudinally spaced points, a series of receptacles or buckets 42 which, as they pass around the lower sprockets 38, are adapted to scoop up and then elevate any heavy solids which may have settled in the basin 11. The said chains also carry the transverse bar structures 43 which are provided with teeth or serrations 44 so positioned and arranged that as the structures move upwardly in front of the screen 40 the said teeth 44 will enter between the bars 41 of the screen and act as rakes or combs to scrape accumulated debris from the screen. Such matter, as well as the settled solids contained in the buckets 42, is carried upwardly into the housing 20, and as the buckets and combs pass about the upper sprockets 29, will be discharged into a hopper 45 positioned within the housing 20 and conducted thereby into a suitable receptacle 46, which latter may be moved from time to time and the screenings and settled matter disposed of in any suitable manner.

Extending from the upper portion of the screen 40 to the head shaft 25 is a plate or apron 48 the upper portion of which is curved as at 49 about the head shaft 25 so that the said apron 48 may be moved longitudinally by the said shaft as it is adjusted by the take-ups 23, as will be readily understood. This apron serves to prevent any screened matter which might spill from the buckets and combs or rakes from dropping back through the open bottom of the housing into the screened liquid beyond the screen 40.

Extending from the lower end of the screen 40 to the tail shaft 37 and located between the conveyor runs is a bulkhead 50 here shown as being of a hollow sheet metal construction. The rear wall of this bulkhead, as clearly shown in Figs. 1 and 2, is spaced a sufficient distance from the rear wall 53 of the settling basin 11 to permit the buckets 42 to travel freely, and the said bulkhead serves to prevent escape of unscreened liquid below the screen 40, as will be readily apparent. The buckets 42 are preferably so spaced longitudinally of the chains 28 that at least one of them is at all times in the channel between the bulkhead and basin walls so as to prevent by-passing of liquid-carried debris through the channel between the bulkhead and basin wall.

As above explained, the entire apparatus including the superstructure or housing 20, its depending channel frame members 35, the screen 40, the endless conveyor 26, and the driving means therefor, as well as the slidable apron 48 and bulkhead 50, all constitute a unitary structure which may be bodily introduced into the conduit 10 and removed therefrom, all as will be readily understood.

Although the apparatus has been here illustrated as being inclined at an angle of about 60° to horizontal, it obviously may be arranged in other planes, including the vertical.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:—

1. In screening apparatus for liquids, a framework adapted to extend downwardly into a liquid conduit; an inclined screen carried by said framework across the conduit; an endless conveyor including an adjustable slack take-up head shaft mounted in said framework above said screen, said conveyor having a run disposed in co-operative relationship to said screen, and being provided with means arranged to remove settled solids from the conduit, and also to remove debris from said screen; and an inclined apron extending upwardly from said screen to said head shaft, said apron being slidably mounted in said framework for movements relative to the screen, and arranged to be moved with said head shaft to at all times close the space between the screen and head shaft and thereby prevent material spilling from said removing means from passing to the screened liquid.

2. In screening apparatus for liquids, a framework adapted to extend into a liquid conduit; a bar screen carried by said framework; an endless conveyor including an adjustable head shaft, mounted in said framework, having a run disposed co-operatively adjacent the face of said screen, said conveyor having receptacles arranged to scoop up and elevate solids which have settled in a localized portion of the conduit, and combs arranged to traverse the bars of said screen and remove debris accumulated thereon; means for adjusting said head shaft; and a slidable apron extending from said screen to said head shaft and secured thereto for movement therewith.

3. In screening apparatus for liquids, a framework adapted to extend into a liquid conduit; a vertically extending bar screen carried by said framework; an endless conveyor including an adjustable head shaft, mounted in said framework, having an upwardly moving run disposed in front of said screen and a downwardly moving run disposed behind said screen, said conveyor having buckets arranged to scoop up and elevate solids which have settled in a localized portion of the conduit, said conveyor being also provided with combs arranged to traverse the face of said screen during the upward run of the conveyor and remove floatable debris accumulated thereon; means for adjusting said head shaft; and a longitudinally slidable apron curved around said head shaft and movable therewith, and extending toward the upper portion of said screen.

4. In screening apparatus for liquids, a conduit provided with a solids settling basin having side and end walls; a conveyor entering said basin, having receptacles for removing solids settled therein; a screen disposed across said conduit above said basin in a plane substantially parallel to but spaced from one of said end walls; and means below said screen extending across said basin intermediate its end walls, arranged in conjunction with one of said end walls and the successive conveyor receptacles to prevent by-passing of liquid-carried debris around said screen, there being at all times at least one of said conveyor receptacles co-operating with said means.

5. In screening apparatus for liquids, a conduit provided with a solids settling basin having side and end walls; a conveyor entering said basin, having receptacles for removing solids settled therein; a screen disposed across said conduit above said basin intermediate its end walls; and a transverse bulkhead across said basin extending downwardly from said screen in a plane parallel to but spaced from one of said end walls, arranged in conjunction with said end wall and the conveyor receptacles to prevent liquid-carried debris from by-passing said screen, there being at least one of said receptacles between said bulkhead and end wall at all times.

6. In screening apparatus for liquids, a conduit having a solids-settling basin provided with a transverse wall; an endless conveyor entering said basin, having receptacles traveling adjacent said basin wall for removing solids settled in said basin; a screen disposed across said conduit above said basin, intermediate the runs of said conveyor; and a transverse bulkhead in said basin below said screen, disposed substantially parallel to but spaced from said basin wall to provide a passageway for said conveyor receptacles, there being at all times at least one of said receptacles in said passageway to prevent, in conjunction with said bulkhead and basin wall, the by-passing of liquid carried debris around said screen.

ARTHUR C. LIND.